Dec. 30, 1941.   H. M. EVJEN   2,268,137
ELECTRICAL WELL-LOGGING SYSTEM
Filed Dec. 11, 1939
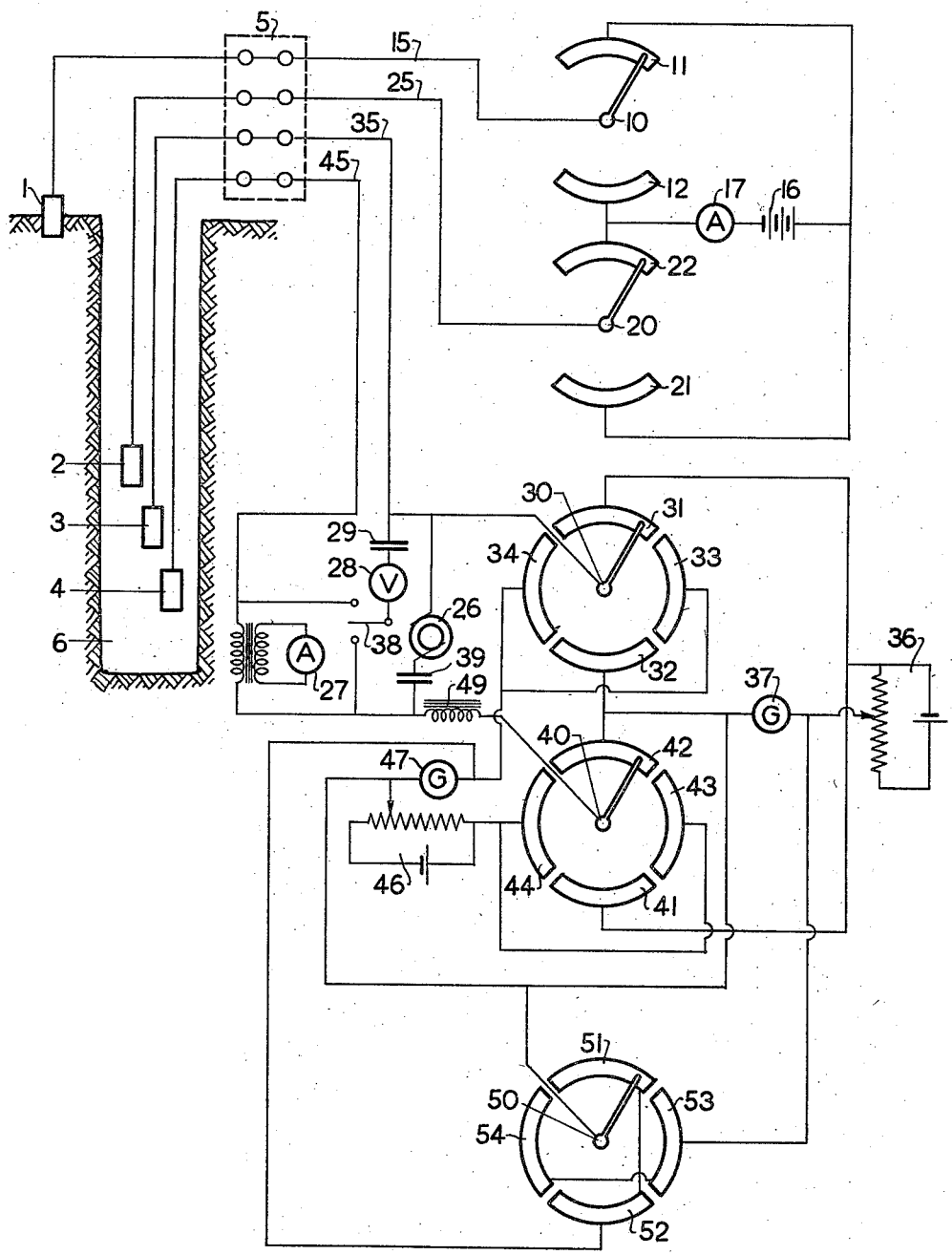
Inventor: Haakon Muus Evjen
By his Attorney Patented Dec. 30, 1941

2,268,137

UNITED STATES PATENT OFFICE 2,268,137

ELECTRICAL WELL-LOGGING SYSTEM

Haakon Muus Evjen, Houston, Tex., assignor to Shell Development Company, San Francisco, Calif., a corporation of Delaware Application December 11, 1939, Serial No. 308,519

3 Claims. (Cl. 175—182)

This invention pertains to improvements in methods for electrically exploring underground structures, and relates more specifically to a system whereby all the essential data necessary for logging or coring the earth formations traversed by uncased boreholes filled with a fluid may be obtained in a single operation or run.

In order to obtain a reasonably complete criterion for purposes of correlation and determination of water and oil-bearing strata, it is necessary to obtain by electrical logging methods indications as to the following quantities:

1. The formation resistivity in a relatively limited flooded zone immediately adjacent the borehole and invaded by the fluid filling the borehole;

2. The true formation resistivity in a relatively extended zone surrounding the borehole and separated therefrom by said first zone; and 3. The spontaneous potential difference existing between a point in the borehole and a point at or near the surface of the ground outside the borehole, or between two points in the borehole, this potential difference being due to the contact electromotive forces between the fluid in the borehole and the logging electrodes lowered thereinto, and/or to the electrical phenomena such as electro-filtration and electro-osmosis which occur spontaneously at the level of porous strata when the borehole is filled with fluid.

Consequently, a complete electrical survey entails at least three types of separate measurements resulting in a log comprising a so-called lateral penetration curve, a resistivity curve and a spontaneous potential curve.

Heretofore it has been customary to measure only two of said quantities simultaneously, the third quantity being measured subsequently with a modified arrangement of apparatus. This procedure required, therefore, two separate runs into the borehole with the measuring electrodes and cables, and resulted in a loss of valuable drilling time and an increase in the cost of electrical logging surveys.

It is, therefore, an object of this invention to provide an improved method and apparatus whereby at least three separate measurements may be effected simultaneously to give a complete electrical log of the formations traversed by a borehole.

It is also an object of this invention to provide an electrical logging system involving the use of direct and alternating current devices whereby various electrical phenomena occurring spontaneously or caused by the passage of electrical currents in the borehole and adjacent formations may be separated from each other, the independent values observed or registered for each of said phenomena not being affected by the manipulations necessary for simultaneously measuring the other independent values.

These and other objects of the present invention will be understood from the following description taken with reference to the annexed drawing, showing diagrammatically the arrangement of apparatus used in practicing the present invention.

The drawing shows a fluid-filled borehole 6, and electrodes 1, 2, 3 and 4 in contact with the borehole fluid or with the ground, preferably at or near the surface and at a desired distance from the borehole. The electrodes are supported and/or electrically connected in the desired circuit by means of insulated cables 15, 25, 35 and 45, or by means of mutually insulated conductors within a single cable, to a synchronous commutator arrangement to be described below. A switch panel 5 is interposed between the commutator and the electrodes, whereby the connections to the latter may be quickly and conveniently interchanged in any desired manner. It is understood that the cables are associated with any and all desired means for lowering or raising said electrodes in the well and for varying the spacing between said electrodes.

The synchronous commutator comprises rings having conductor segments 11, 12, 21, 22, 31—34, 41—44 and preferably also 51—54. Although the diagrammatic drawing shows the electrodes 1—4 connected to stationary commutator segments by means of rotatable brushes or wipers 10, 20, 30 and 40, which are assumed to be mounted on a single shaft and rotated in synchronism in and out of contact with the commutator segments, it is understood that such arrangement is used here only for purposes of illustration, and that in practice it is possible to use any other suitable type of synchronous commutator. The commutator rings will, therefore, be referred to hereinbelow as commutator rings 10, 20, 30, 40 and 50.

With the switch panel as shown in the drawing, electrodes 1 and 2 and commutator rings 10 and 20 form the current circuit, that is, the circuit serving to pass a commutated or reversing direct current through the borehole fluid and the ground between electrodes 1 and 2.

Electrodes 3 and 4 and commutator rings 30 and 40 form the potential circuit, that is, the circuit serving to measure the potential difference generated between electrodes 3 and 4 either spontaneously, or due to the flow of the commutated direct current between electrodes 1 and 2. According to the present invention, electrodes 3 and 4 serve also to pass an alternating current therebetween, and to measure the impedance of the circuit to said alternating current.

For these purposes, the current commutator segments 11 and 21 are connected to one terminal of a source of electric current, such as a storage battery, cell, D. C. generator, etc., shown at 16, while segments 12 and 22 are connected to the other terminal. A D. C. ammeter, or any other suitable D. C. indicating device is connected in series with the battery 16 to indicate the intensity of the current flowing between electrodes 1 and 2.

In the same manner, segments 31 and 41 of the potential commutator rings are connected to one terminal of a potentiometer arrangement 36 comprising a D. C. galvanometer 37, while segments 32 and 42 are connected to the other terminal.

Commutator segments 33 and 34 are connected to one terminal of a second potentiometer arrangement 46 comprising a D. C. galvanometer 47, while segments 43 and 44 are connected to the other terminal.

An A. C. generator, oscillator or other source of alternating current 26 is connected between the conductors 35 and 45 to electrodes 3 and 4, a condenser 39 being inserted in series therewith to prevent any flow of direct current therethrough.

An iron core choke 49 is inserted in the conductor 45 between the A. C. generator 26 and the commutator ring 40 to prevent alternating current from disturbing the indicating devices connected to the commutator.

An A. C. ammeter 27, which may conveniently be of the current transformer type is inserted in the conductor 45 between the A. C. generator 26 and the electrode 4 to measure the intensity of the A. C. current flowing between the electrodes 3 and 4.

An A. C. voltmeter 28, in series with a condenser 29 serving to block the flow of direct current, is connected between the electrodes 3 and 4 to measure the A. C. potential difference impressed therebetween, a double-throw switch 38 being used to include or exclude the resistance drop across the ammeter 27 from said potential difference.

The commutator ring 50—54 is not directly connected to any of the electrodes, but is used for alternately short-circuiting D. C. galvanometers 37 and 47 during the cycle periods when these galvanometers are inoperative.

Thus, when electrodes 3 and 4 are connected through brushes 30 and 40 and segments 31 and 42 (or 32 and 41) to galvanometer 37, galvanometer 47 remains inoperative, since the segments 33—34 and 43—44, to which said galvanometer is connected remains on open circuit. During this period, galvanometer 47 is short-circuited through the leads connecting it to brush 50, synchronized with brushes 30 and 40, and segments 51 and 52, the latter being in fixed electrical connection with each other.

Inversely, when the brushes 30 and 40 are in contact with segments 33 and 43 (or 34 and 44) and galvanometer 37 is inoperative, the latter is short-circuited by the contact of brush 50 with segments 53—54. This short-circuiting action of the commutator ring 50—54 is important to stabilize the operation of the galvanometers 37 and 47.

The operation of the present system permits the effecting simultaneously of the following measurements:

The rotation of the current commutator rings 10 and 20 connects electrodes 1 and 2 to the positive and negative terminals, respectively, of the D. C. source 16 during a portion of the cycle, reverses these connections during another portion of the cycle, and keeps said electrodes on open circuit during the rest of the cycle. A reversing commutated current flows, therefore, between electrodes 1 and 2 during a portion of each cycle.

The rotation of the potential commutator rings 30 and 40, synchronized with that of rings 10 and 20, connects electrodes 3 and 4 to the potentiometer arrangement 36—37, reversing said connections in synchronism with the reversals of the direction of the current flow between the electrodes 1 and 2, whereby the reversing potential generated between electrodes 3 and 4 due to the flow of the commutated current between electrodes 1 and 2 is indicated by direct current readings of galvanometer 37.

From the measured potential difference due to the commutated current, it is possible to determine the resistivity of the formations, as explained, for example, in the Patent No. 1,819,923 to Schlumberger. Due to a relatively large penetration into the formations of the exploring current passing between the electrodes 1 and 2 in this case, the result of this measurement will refer mainly to the resistivity of the formations at some distance from the borehole, that is, in a zone in the vicinity of the borehole but separated from the borehole by a zone immediately adjoining said borehole and permeated with the borehole fluid.

During that portion of each cycle when the electrodes 1 and 2 remain on open circuit, electrodes 3 and 4 are connected through commutator segments 33, 34, 43 and 44 to potentiometer arrangement 46—47, the galvanometer 47 indicating the spontaneous potential difference existing between the electrodes 3 and 4 when no current flows between the electrodes 1 and 2.

The alternating current generated by the generator or oscillator 26 flows, due to the action of the choke 49, substantially only through the ground between the electrodes 3 and 4. The small fraction of this current which passes back through the galvanometers 37 and 47 has no effect on the measurements, said galvanometers being D. C. instruments.

From the measured values of the alternating potential and current, it is possible to determine the impedance between the electrodes 3 and 4. In well-known manner (see, for example, Franz Ollendorff, "Erdstrome," Julius Springer, 1938), the impedance of the grounded electrodes depends on the resistivity of the adjoining ground. By suitably adjusting the size and shape of said electrodes, it is possible, therefore, in a manner well known in the art, to deduce from this impedance the resistivity of the ground in the region immediately adjacent the borehole and permeated by the fluid filling said borehole.

It is understood that the galvanometers 37 and 47 for measuring respectively the potential difference generated between electrodes 3 and 4 by the current flowing between electrodes 1 and 2, and the spontaneous potential existing between said electrodes 3 and 4, may be of the automatically recording or oscillograph type, according to principles well known in the art.

It is also understood that the connections between the electrodes 1—4 and the several commutator rings may be interchanged in any desired way by means of the switch panel 5, whereby a series of valuable checks may be obtained by repeating the measurements, and different or modified quantities may be measured. Thus, by interchanging the leads of the electrodes 1 and 2 with those of electrodes 3 and 4, it is possible to measure, for example, the spontaneous potential existing between a point in the borehole and a point at or near the surface of the ground at any desired distance from the borehole.

I claim as my invention:

1. In an electrical circuit for logging formations traversed by a borehole, at least one electrode in contact with the ground at the surface thereof and a plurality of cable supported electrodes within the borehole, means for passing an interrupted reversing direct current between two of said electrodes, means for passing an alternating current between two other electrodes, first direct current indicating means for observing the potential generated between the second two electrodes by the flow of the reversing direct current between said first two electrodes, alternating current indicating means for observing the impedance to the flow of the alternating current between said second two electrodes, second direct current indicating means for observing the spontaneous potential existing between said second two electrodes during the interruptions in the flow of the reversing direct current between the first two electrodes, and filter means in the circuit between said second two electrodes to separate the flow of the direct current from that of the alternating current.

2. In an electrical circuit for logging formations traversed by a borehole, at least one electrode in contact with the ground at the surface thereof and a plurality of cable supported electrodes within the borehole, commutator means for passing an interrupted reversing direct current between two of said electrodes, indicating means for observing the potential generated between two other electrodes by the flow of the reversing direct current between the first two electrodes, commutator means for reversing the terminal connections of said indicating means in synchronism with the reversals of the current flow and for disconnecting said indicating means in synchronism with the interruptions of the current flow between the first two electrodes, second direct current indicating means for observing the spontaneous potential existing between said second two electrodes, commutator means for disconnecting said second indicating means in synchronism with the current flow between said first two electrodes, means for passing an alternating electric current between said second two electrodes, alternating current indicating means for observing the impedance to the flow of the alternating current between said two electrodes, and filter means in the circuit between said two electrodes to separate the flow of the direct current from that of the alternating current.

3. In an electrical circuit for logging formations traversed by a borehole, at least one electrode in contact with the ground at the surface thereof and a plurality of cable supported electrodes within the borehole, commutator means for passing an interrupted reversing direct current between two of said electrodes, indicating means for observing the potential generated between two other electrodes by the flow of the reversing direct current between the first two electrodes, commutator means for reversing the terminal connections of said indicating means in synchronism with the reversals of the current flow and for disconnecting said indicating means in synchronism with the interruptions of the current flow between the first two electrodes, second direct current indicating means for observing the spontaneous potential existing between said second two electrodes, commutator means for disconnecting said second indicating means in synchronism with the current flow between said first two electrodes, means for passing an alternating electric current between said second two electrodes, alternating current indicating means for observing the impedance to the flow of the alternating current between said two electrodes and commutator means for short-circuiting said first direct current indicating means in synchronism with periods of interruption of the current and for short-circuiting said second direct current indicating means in synchronism with periods of flow of the current through said first two electrodes, and filter means in the circuit between said two electrodes to separate the flow of the direct current from that of the alternating current.

HAAKON MUUS EVJEN.